Patented Apr. 27, 1943

2,317,611

UNITED STATES PATENT OFFICE

2,317,611

CASHEW NUT SHELL LIQUID MATERIAL COMPOSITIONS AND BASES CARRYING THE SAME

Edward C. Homan, East Orange, N. J., assignor, by mesne assignments, to The Harvel Corporation, a corporation of New Jersey No Drawing. Application December 7, 1939, Serial No. 307,985

4 Claims. (Cl. 260—29)

The present invention relates to compositions of matter made from cashew nut shell liquid, or similar materials, and organic solvent soluble or hydrophobe condensation reaction products of formaldehyde and a urea and the present invention also relates to methods of preparing and using the products of the present invention.

The products of the present invention are soluble in organic solvents and are prepared or made from urea-formaldehyde condensation products which are soluble in organic solvents, that is, from hydrophobic or water-insoluble urea-formaldehyde condensation products.

Examples of hydrophobic or organic solvent soluble urea-formaldehyde condensation products are those described in Patent Reissue No. 20,383, Ripper, May 25, 1937; Patent Reissue No. 19,463, Ripper, Feb. 12, 1935; and patents to Lauter Numbers 1,633,337, June 21, 1927; 1,671,596, May 29, 1928; and 1,672,848, June 5, 1928, to each of which reference is hereby made as part of the disclosure for the practice of the present invention.

Examples of cashew nut shell liquid materials suitable for use with organic solvent soluble urea-formaldehyde condensation products are raw cashew nut shell liquid; cashew nut shell liquid which has been treated to have the naturally occurring metals precipitated therefrom as, for example, by the method described in Patent Number 2,067,919 to Harvey and Damitz; liquid polymers of cashew nut shell liquid, also described in said Patent Number 2,067,919; cardanol; hydrocarbon ethers of cashew nut shell liquid of treated cashew nut shell liquid, of liquid polymers of cashew nut shell liquid, and of cardanol; and hydrocarbon ethers, hydrocarbon ester derivatives of cashew nut shell liquid or of the cardol to anacardic acid constituents of cashew nut shell liquid. These are given as examples and not as limitations because there are numerous equivalent derivatives of cashew nut shell liquid which can be used in the practice of the present invention, including condensation products thereof or of certain one thereof with reactive methylene group containing agents such as formaldehyde, furfuraldehyde, hexamethylene tetramine and paraformaldehyde.

Illustrative examples of the practice of the present invention are as follows:

*Example 1.*—About three parts by weight of the amyl ether of cashew nut shell liquid and one part of a solution of a urea-formaldehyde resin in solution in octyl alcohol, fifty per cent solids, are dissolved together. These materials are completely soluble together and form a uniform solution.

*Example 2.*—About three parts by weight of amyl ether of cashew nut shell liquid, about one part of a 50% solution of an organic solvent soluble urea-formaldehyde resin in octyl alcohol and six parts of mineral spirits (petroleum spirits such as "Varnolene," kerosene or gasoline) are dissolved together.

*Example 3.*—About three parts by weight of cashew nut shell liquid and one part of hexamethylene tetramine are heated together up to about 250° F. and held at that temperature for about thirty minutes after which two parts of a fifty per cent solution of an organic solvent soluble urea-formaldehyde resin in octyl alcohol (or in equal parts of butyl alcohol and xylol) and four parts of a petroleum spirits ("Varsol" for example) are added.

*Example 4.*—About two parts by weight of gilsonite, four parts of amyl ether of cashew nut shell liquid, two parts of a fifty per cent solution of an organic solvent soluble urea-formaldehyde resin in octyl alcohol, and ten parts of solvent naphtha are dissolved together.

The products of the above examples and similar products made from the other cashew nut shell liquid materials given herein as examples can be applied as surface coatings and as impregnating materials and can be set to an infusible, insoluble homogeneous state by baking at from about 225° F. to about 320° F., 250° F. being a good baking temperature, and the solvent is evaporated off during the heating. Said products are heat convertible compositions which after being set to said infusible and homogeneous state by the application of heat have the characteristic of being resistant to the solvent action of chloroform, amyl acetate and butyl acetate.

The products of Example 1 to 4 are suitable also for coating paper and cloth for various purposes to obtain resistant, infusible and insoluble films. The products of Examples 1, 2 and 4, for example, are suitable for coating on cloth such as cambric, linen and silk for use as electrical insulation such as in a wrapping for an electrical cable, important advantages being that the coating made by the method of the present invention can be made without having driers incorporated therein such as manganese dioxide, manganese resinate, cobalt and other driers so that the resulting coated fabric has good insulating qualities, both dielectric and power factor over a long life and also that the fabric has an initial tearing strength higher than is generally obtained with coatings using driers and that strength continues through a long life in the fabric. A further advantage of the use of the products of the present invention for flexible coatings on fabrics for electrical insulation, and other purposes, is that they can be made without incorporating drying oils with them because, even without the use of artificial driers, drying oils will oxidize and in oxidizing not only will become less flexible but will cause the fabric to oxidize and to have a shortened life. The use of driers with the drying oils will increase this effect in proportion and in accordance with the amount of and kind of driers used. The films made with the products of the present invention are stable and do not oxidize. The product of Example 3, for example, is suitable for coating on paper for use as liners for the caps and covers of containers for food, cosmetics, paints and so on. The products of Examples 1 to 4, for example, are suitable for coating on cloth for use as diaphragms of pumps for fuel oils such as crude oil, gasoline and kerosene.

It is to be noted herein that the urea-formaldehyde condensation products suitable for use in the practice of the present invention are those described in the above identified United States Letters Patent and particularly those soluble in or produced in alcohols, although no limitation is made thereto. The alcohols most suitable for dissolving or producing urea-formaldehyde condensation which are suitable for use in the practice of the present invention are those having from four to fourteen carbon atoms and can be any of the primary, secondary or tertiary alcohols in that group.

It is to be noted too that the steps in the practice of the method of the present invention can be varied, for example, a molecular weight equivalent of urea and material selected from the group consisting of cashew nut shell liquid, cardanol, hydrocarbon ethers of cashew nut shell liquid and hydrocarbon ethers of cardanol can be heated together to produce a uniform body, at 225° F. for example, and then from about two to about four molecular weight equivalents of formaldehyde added and heated at about 250° F., for example, to produce condensation between the formaldehyde and the urea which has been heated into the cashew nut shell liquid material. This product is useful generally where the other products of the present invention are useful, particularly for the uses thereof described herein.

Having thus described my invention, what I claim and desire to protect by Letters Patent is:

1. A heat convertible composition of matter comprising a solution of a cashew nut shell liquid material selected from the group consisting of cashew nut shell liquid, cardanol, hydrocarbon ethers of cashew nut shell liquid, hydrocarbon ethers of cardanol and hydrocarbon ether, hydrocarbon ester of cashew nut shell liquid and a solution of an organic solvent soluble urea-formaldehyde resin in an alcohol having from four to fourteen carbon atoms, said cashew nut shell liquid material being present in amounts greater than that of the urea-formaldehyde resin, said composition of matter adapted to be converted by heat to an infusible solid material resistant to the solvent action of chloroform, amyl acetate and butyl acetate.

2. An electrical insulating material comprising a base carrying an infusible composition resistant to the solvent action of chloroform, amyl acetate and butyl acetate and obtained by heating a solution of a cashew nut shell liquid material selected from the group consisting of cashew nut shell liquid, cardanol, hydrocarbon ethers of cashew nut shell liquid, hydrocarbon ethers of cardanol and hydrocarbon ether, hydrocarbon ester of cashew nut shell liquid and a solution of an organic solvent soluble urea-formaldehyde resin in an alcohol having from four to fourteen carbon atoms, said cashew nut shell liquid material being present in amounts greater than that of the urea-formaldehyde resin.

3. A base carrying an infusible composition resistant to the solvent action of chloroform, amyl acetate and butyl acetate and obtained by heating a solution of a cashew nut shell liquid material selected from the group consisting of cashew nut shell liquid, cardanol, hydrocarbon ethers of cashew nut shell liquid, hydrocarbon ethers of cardanol and hydrocarbon ether, hydrocarbon ester of cashew nut shell liquid and a solution of an organic solvent soluble urea-formaldehyde resin in an alcohol having from four to fourteen carbon atoms, said cashew nut shell liquid material being present in amounts greater than that of the urea-formaldehyde resin.

4. A fibre base carrying an infusible composition resistant to the solvent action of chloroform, amyl acetate and butyl acetate and obtained by heating between about 225° F. and 320° F. a solution of a cashew nut shell liquid material selected from the group consisting of cashew nut shell liquid, cardanol, hydrocarbon ethers of cashew nut shell liquid, hydrocarbon ethers of cardanol and hydrocarbon ether, hydrocarbon ester of cashew nut shell liquid and a solution of an organic solvent soluble urea-formaldehyde resin in an alcohol having from four to fourteen carbon atoms, said cashew nut shell liquid material being present in amounts greater than that of the urea-formaldehyde resin.

EDWARD C. HOMAN.